United States Patent Office 3,423,611
Patented Jan. 21, 1969

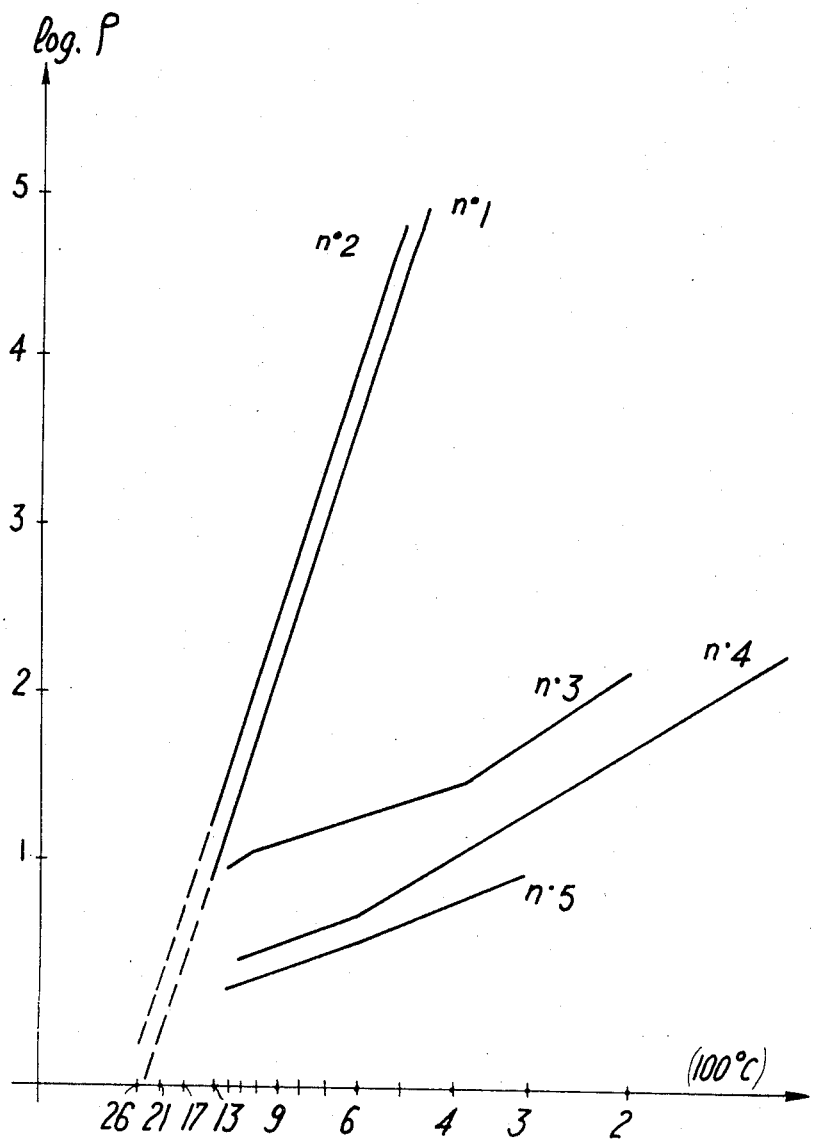

3,423,611
ELECTRODE AND METHOD OF FABRICATION
Antoine d'Albis, Paris, David Yerouchalmi, Issy-les-Moulineaux, and Bernard Bouillon, Bourg-la-Reine, France, assignors to Commissariat a l'Energie Atomique, Paris, France
Filed May 23, 1966, Ser. No. 589,476
Claims priority, application France, May 25, 1965, 18,237; May 12, 1966, 61,379
U.S. Cl. 310—11                 7 Claims
Int. Cl. H02k This invention relates to an electrode which is primarily designed to establish an electrical connection between a fluid which is heated to a high temperature and a conductor which is at low temperature, for example in the channel of a magnetohydrodynamic (MHD) converter. The invention is also concerned with a method for the fabrication of an electrode of this type.

In formulating a suitable electrode design for operation in MHD generators, consideration has been given to the use of refractory oxides such as zirconia or thoria which are stabilized by a predetermined percentage of calcium oxide, yttrium oxide or rare-earth oxides. These stabilizing oxides produce ion vacancies in the crystal lattices of zirconia or thoria which render these oxides conductive at high temperature.

However, an electrode of the type employed in MHD generators cannot be formed solely by a refractory oxide, even in the stabilized state, by reason of the fact that the oxide is no longer hot enough to be conductive when it exceeds a given thickness. In fact, it is known that the electrodes which are placed in the channel of a MHD converter usually have the shape of a plate which is heated only on one face, namely the face which is in contact with the ionized gas.

The electrode in accordance with the invention is designed to overcome the disadvantages noted above. Said electrode consists of a laminated ceramic plate and the top layer of said plate, namely the layer which is in contact with the hot ionized gases, is formed on a first refractory oxide which is stabilized and conductive in the hot state whilst the following layers of said plate are formed in turn of the same stabilized refractory oxide which is enriched to a progressively increasing extent with a second refractory oxide in proportions such that the conductivity of the bottom layer at its working temperature is equal to the conductivity of the top layer.

The figure on the drawing presents graphs 1 to 5 to show the variation of resistivity with temperature of the respective layers 1 to 5 in Example 1, below.

The first refractory oxide usually consists of zirconia or thoria which are stabilized by a predetermined percentage of yttrium oxide, calcium oxide or rare-earth oxides such as the oxides of cerium, gadolinium and samarium.

The second refractory oxide consists of chromic oxide (III) or of a mixed oxide corresponding to the general formula $(M_xCr_{2-x})O_3$, wherein $x$ is very close to 1 and M is either yttrium or a trivalent metal of the lanthanide group, the electrical conduction of which is predominantly electronic.

The compounds which correspond to each of the layers of the electrode are prepared separately by mixing a refractory oxide powder with a chromic oxide powder or with a mixed refractory oxide in suitable proportions and in the presence of a binder, the particle size of the powders employed being within the range of 50 to 200$\mu$.

These compounds are deposited in a mold by superposition and compacted at a pressure ranging from 2 to 5 metric tons per square centimeter. The part which is thus obtained in then sintered in a furnace and in an inert atmosphere at a temperature within the range of 1500 to 2000° C., with a temperature rise cycle which will preferably be 100° C. per hour followed by a level-temperature stage of 2 hours at the sintering temperature.

The bottom layer of the electrode, namely the layer which contains the highest proportion of the second refractory oxide, is coated with a metal deposit which serves as current collector. This coating can be formed by depositing with a plasma gun a layer of nickel or chrome nickel, or alternatively, the coating can consist of conductive lacquers containing silver or platinum or a conductive enamel containing nickel.

One particularly appropriate solution consists in effecting in vacuo a first metallization of said layer which has previously been degassed between 600 and 900° C. The purpose of the degassing process is to enable the metal vapors to penetrate more readily into the part as a result of the open porosity of this latter, thereby enhancing the adhesion of the subsequent metal coating.

There will now be given two non-limitative examples of construction of an electrode in accordance with the invention, said electrode being formed of a laminated plate, the layers of which were enriched with chromic oxide in the first example and with mixed chromium/ lanthanum oxide in the second example.

Example 1

An electrode which was made up of five superposed layers was prepared in accordance with the compositions recorded in the table below.

The percentages are indicated by weight.

| Layers | $ZrO_2$ | $Y_2O_3$ | $Cr_2O_3$ |
|---|---|---|---|
| 1 | 97.94 | 2.06 | 0 |
| 2 | 87.64 | 2.06 | 10.30 |
| 3 | 67.01 | 2.06 | 30.93 |
| 4 | 53.61 | 0 | 46.39 |
| 5 | 32.99 | 0 | 67.01 |

Each of the above compounds was prepared separately by mixing a stabilized zirconia powder with a chromic oxide powder in the proportions which are indicated (except for the first or top layer which consists solely of stabilized zirconia), and by addition of 3% by weight of acrylic resin which served as binder, the particle size of the powders employed being approximately 150$\mu$.

These compounds were placed in turn in a mold of suitable shape and compacted at a pressure of 5 t./cm.$^2$. The parts which were thus obtained were sintered at 1800° C. in an argon atmosphere furnace. The temperature rise was 100° C./h. and the heating was carried on for a period of 2 hours at 1800° C. The sintered mass was then allowed to cool to room temperature in an argon atmosphere.

In order to determine the electrical resistivity of each constituent layer of the electrode, each of the compounds mentioned above was formed separately under the same conditions as a complete electrode.

Measurements of electrical resistivity were taken by means of an opposition bridge which served to measure the voltage between two points of a test specimen through which a direct current was passed.

The results obtained in the case of each compound are shown in the drawing. The temperatures in degrees C. as calculated from the reciprocal of the absolute temperatures have been plotted as abscissae and the logarithms of the resistivities have been plotted as ordinates.

It can readily be seen that, above 1300° C., the top layer which is solely formed of zirconia satisfies preestablished conditions. Below 1300° C., these conditions are more effectively met by those layers which are enriched with chromic oxide.

Example II

An electrode was constructed in the form of a laminated plate comprising ten superposed layers. The top and bottom layers had the following stoichiometric compositions:

$$0.1\ (ZrO_2 0.07\ CaO) + 0.9\ CrO_3La$$

and $$0.9\ (ZrO_2 0.07\ CaO) + 0.1\ CrO_3La$$

and the compositions of the intermediate layers varied progressively from the first to the second value.

Each constituent layer of the electrode was prepared separately by mixing a stabilized zirconia powder with calcium oxide and a mixed chromium/lanthanum oxide powder in suitable proportions with an addition of 2% by weight of acrylic resin which served as binder, the particle size of the powders employed being in the vicinity of $150\mu$.

These compounds were then placed in turn in a mold of suitable shape, then compacted by hydrostatic pressing at 3 t./cm.² The parts thus obtained were sintered at 1650° C. in a vacuum furnace for a period of 2 hours.

The electrical conductivities of a layer having the following composition were determined at different temperatures:

$$0.7\ (ZrO_2 0.07\ CaO) = 0.3\ CrO_3La$$

The results obtained are recorded in the table given below:

| Temp.° C. | Resistivity (ohm-centimeter) | Conductivity mho/cm. |
|---|---|---|
| 1,100 | 3.2 | 0.31 |
| 1,200 | 2.5 | 0.4 |
| 1,300 | 2.0 | 0.5 |
| 1,400 | 1.4 | 0.71 |
| 1,500 | 1.0 | 1 |

It is noted that, at 1100° C., the conductivity of this layer is still good if it is compared with the conductivity of zirconia which is stabilized by 0.07% mol. CaO at the same temperature, which is $7.5\ 10^{-2}$ mho/cm.

What we claim is:

1. An electrode designed for operation in the channel of a magnetohydrodynamic converter, wherein said electrode is made up of a laminated ceramic plate and the top layer of said plate is formed of a first stabilized refractory oxide whilst the following layers of said plate are formed in turn of the same stabilized refractory oxide which is enriched to a progressively increasing extent with a second refractory oxide in proportions such that the conductivity of the bottom layer at its working temperature is equal to the conductivity of the top layer.

2. A method of fabrication of an electrode as claimed in claim 1, wherein said method consists in preparing separately each constituent layer of said electrode by mixing in adequate proportions a powder of a first stabilized refractory oxide with a powder of a second refractory oxide, in superposing said layers in a mold of suitable shape, in compacting and sintering said layers, and in coating the bottom layer with a metal deposit which is intended to collect the current.

3. A method of fabrication of an electrode as claimed in claim 1, wherein said method consists in preparing separately each constituent layer of said electrode by mixing in adequate proportions a refractory oxide powder consisting of stabilized zirconia with a second refractory oxide powder consisting of chromic oxide (III), in superposing said layers in a mold of suitable shape, in compacting and sintering said layers, in coating the bottom layer with a metal deposit which is intended to collect the current.

4. A method of fabrication of an electrode as claimed in claim 1, wherein said method consists in preparing separately each constituent layer of said electrode by mixing in adequate proportions a refractory oxide powder consisting of stabilized zirconia with a second refractory oxide powder consisting of a mixed refractory oxide corresponding to the general formula $(M_x—Cr_{2-x})O_3$ wherein $x$ is very close to 1 and M is yttrium or a trivalent metal of the lanthanide group, in superposing said layers in a mold of suitable shape, in compacting and sintering said layers, in coating the bottom layer with a metal deposit which is intended to collect the current.

5. A method of fabrication of an electrode as claimed in claim 2, wherein the particle size of the powders employed is within the range of 50 to 200 microns.

6. A method of fabrication of an electrode as claimed in claim 2, wherein the layers are compacted at a pressure within the range of 2 to 5 t./cm.²

7. A method of fabrication of an electrode as claimed in claim 2, wherein the sintering process is carried out at a temperature within the range of 1500 to 2000° C.

References Cited

UNITED STATES PATENTS 2,497,111  2/1950  Williams _____ 313—355 X
2,636,856  4/1953  Suggs et al. _____ 313—352 X DAVID X. SLINEY, *Primary Examiner.*

U.S. Cl. X.R.
313—355